Figure 1:
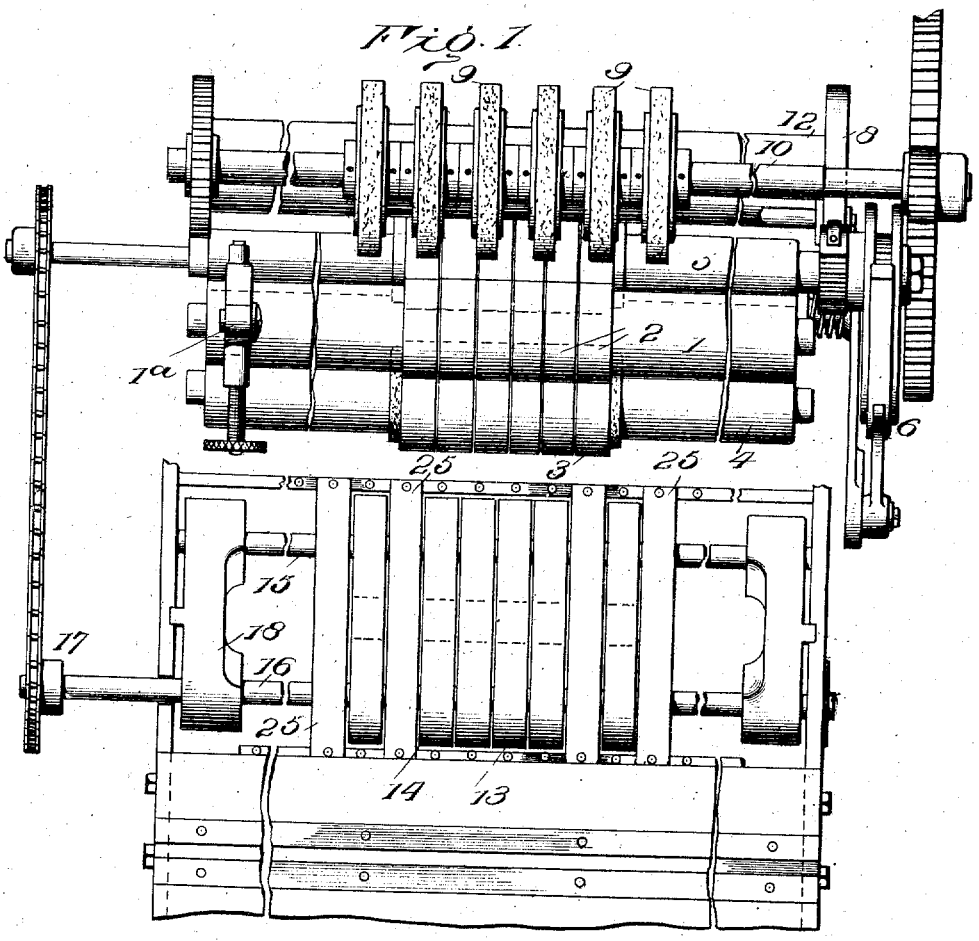

No. 12,292. REISSUED NOV. 29, 1904.

C. G. HARRIS.

SHEET FEED OR SEPARATOR

APPLICATION FILED AUG. 23, 1904

2 SHEETS—SHEET 1.

Witnesses per Mine

Francis S. Magins

Inventor

C. G. Harris

By

Attorney

No. 12,292. REISSUED NOV. 29, 1904.

C. G. HARRIS.

SHEET FEED OR SEPARATOR.

APPLICATION FILED AUG. 23, 1904.

2 SHEETS—SHEET 2.

Inventor

Witnesses

Francis S. Magnus

By

C. G. Harris

Attorney

No. 12,292. Reissued November 29, 1904.

UNITED STATES PATENT OFFICE.

CHARLES GRANT HARRIS, OF NILES, OHIO, ASSIGNOR TO THE HARRIS AUTOMATIC PRESS COMPANY, OF NILES, OHIO, A CORPORATION OF OHIO.

SHEET FEED OR SEPARATOR.

SPECIFICATION forming part of Reissued Letters Patent No. 12,292, dated November 29, 1904.

Original No. 759,705, dated May 10, 1904. Application for reissue filed August 23, 1904. Serial No. 221,904.

*To all whom it may concern:*

Be it known that I, CHARLES GRANT HARRIS, a resident of Niles, in the county of Trumbull, State of Ohio, have invented certain new and useful Improvements in Sheet Feeds or Separators; and I do hereby declare the following to be a full, clear, and exact description of the invention, such as will enable others skilled in the art to which it appertains to make and use the same.

The object of this invention is to improve the construction and enhance the utility of a sheet-feed embodying the invention patented to me in and by Letters Patent of the United States No. 651,307, dated June 5, 1900.

It is well known in the art that there is always some slipping in feeding stock, varying under different conditions. If the paper should be unevenly fed up to the withdrawal-rolls and not being advanced at a speed equal to or greater than the face speed of such rolls, the latter have a tendency to tear the stock; but as my present invention has demonstrated by giving to the paper an accelerated speed—that is, a speed greater than that at which the withdrawal-rolls are rotated—the paper is "overfed," so to speak, between the separator or feeder and the withdrawal-rolls, with the result that the whole width of the paper is well passed between the rolls before they exert a pull or tension thereon.

In the practical application of the invention patented to me by the above-noted Letters Patent the positively-driven contact element is preferably composed of endless bands or belts passed over two rolls, while the upper coöperating frictionally-retarded contact element is in the form of a series of rolls. The positively-driven contact element being intermittently operated ceases to act under its driving agency as a sheet or other article is separated from its pile and fed forward to the withdrawal-rolls; but the sheet being taken up by the latter while still in contact with the two elements composing the separator its further forward movement under the action of the withdrawal-rolls causes the bands of the separator to move with it under the pull or tension exerted on the paper by the withdrawal-rolls. By my present invention it is contemplated to so operate the endless bands of the positively-driven element as to avoid giving a sheet a hard blow in starting it forward—that is to say, the bands are given a gradually-increasing movement—resulting also in overfeeding the stock to the withdrawal-rolls, so that the forward edge is well between the latter before they can exert any tension thereon.

A further object of the present invention is to provide auxiliary feeding means for large stock, so as to give additional forward impulse to the stock, and thereby prevent undue strain upon the main feed.

The invention will be hereinafter fully set forth, and particularly pointed out in the claims.

Figure 3:
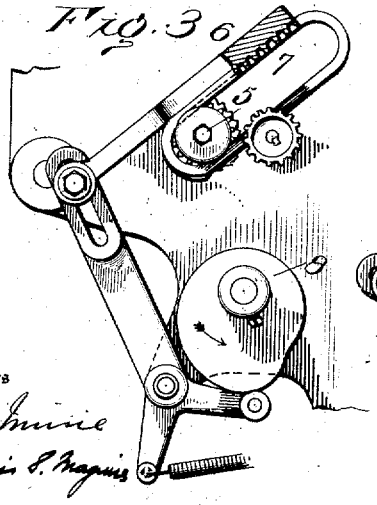
Figure 4:
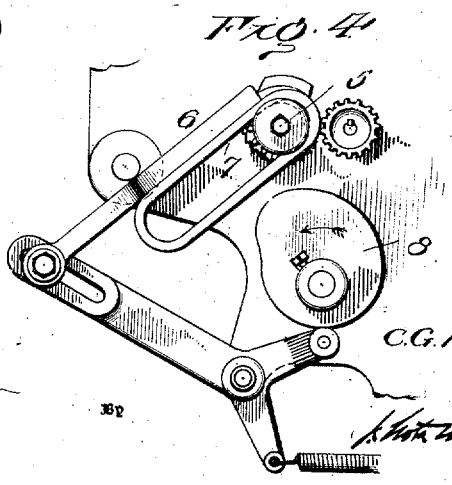
Figure 2:
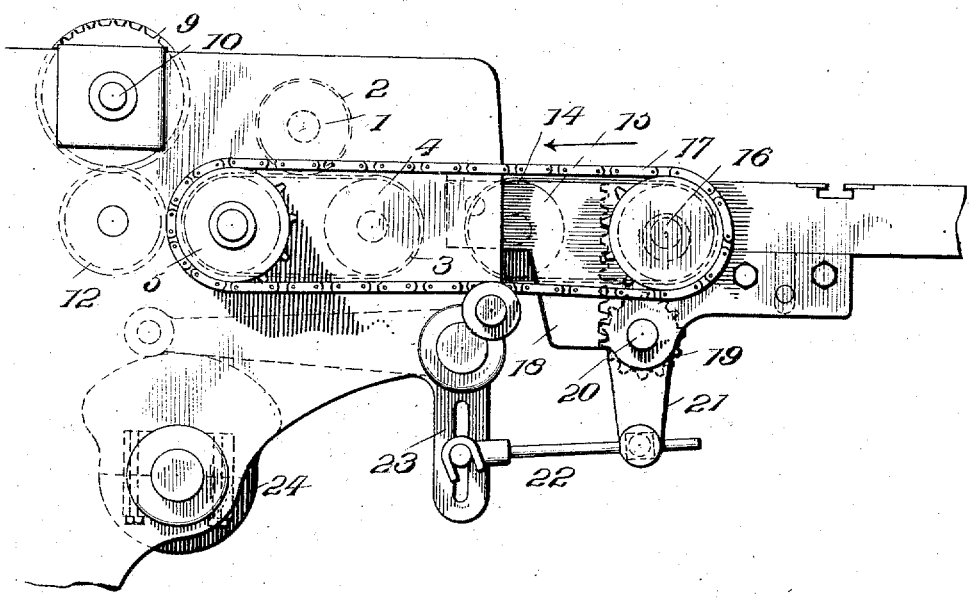
Figure 5:
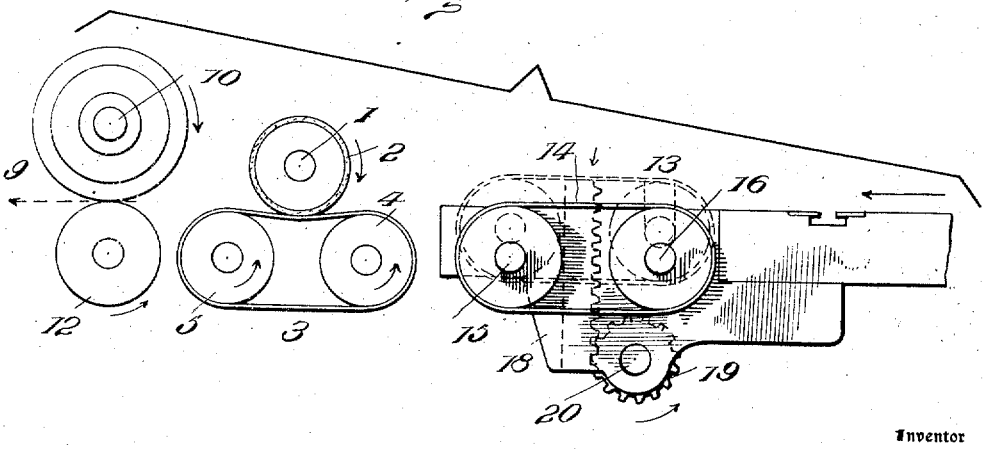

In the accompanying drawings, Figure 1 is a plan view with parts broken away. Fig. 2 is an elevation. Fig. 3 is an enlarged view of one end of the feeder, showing the position of the operative parts upon the completion of the forward positive action of the feeder. Fig. 4 is a like view of the same parts in position at the commencement of the forward positive action. Fig. 5 is a diagrammatic view with the auxiliary feeder shown raised in dotted lines.

Referring to the drawings, 1 designates the shaft, and 2 the rubber rolls, of the frictionally-retarded contact element of the feeder or separator, the brake or retarder being indicated at $1^a$. The positively-driven contact element is shown as composed of endless bands 3, engaging two rolls 4 and 5, the latter at one end being intermittently actuated by suitable mechanism, (indicated at 6.) This mechanism comprises a rack-bar 7, which drives roll 5 only when moved in one direction, such rack-bar being actuated by a constantly-rotated cam 8, the different positions of which are shown in Figs. 3 and 4. This cam is so formed as to impart to the bands composing the positively-driven contact element a gradually-increasing motion, the maximum speed of travel being at the completion of the positive action of the rack-bar, the bands so far as being operated by this mechanism is concerned remaining thereafter unaffected until the rack-bar is again brought into position to effect the gradually-increasing travel thereof.

The withdrawal-rolls are shown as composed of a series of upper rolls 9, mounted on a shaft 10 and engaging a lower roll-shaft 12, both of which are constantly operated in one direction. It is by giving to the stock the gradually-accelerated speed that it is overfed to the withdrawal-rolls and well passed between the latter before they exert any tension thereon. When such tension is so exerted, the driving mechanism 6 has completed its action on the positively-driven contact, and, as occurs with most stock, a portion of the article fed being still between the two contacts when tension is exerted thereon by the withdrawal-rolls the bands of the positively-driven contact will be further rotated by the withdrawal of the article from between the two contacts.

13 designates an auxiliary feed, the purpose of which is to relieve the main feed from undue strain in feeding large stock by giving to the stock an intermittent forward movement synchronously with the action of the main feed. It is located immediately in rear of the latter and consists, in brief, of a series of endless bands 14, passed over two rolls 15 and 16, the latter of which is driven by a chain 17, which derives motion from one of the shafts of the main feed. The rolls 15 and 16 are mounted in head-blocks 18, which are movable vertically in side guides, shown as set in the ends of an opening in the table. These head-blocks are intermittently raised and lowered, being in their elevated positions during the time the bands 14 are positively actuated. Depending rack portions of these head-blocks are engaged by pinions 19 on a shaft 20, having its bearings in the feed-table. A crank 21 of this shaft is connected by a rod 22 to a lever 23, which lever is engaged at one end by a cam 24 on a constantly-operated shaft of the press. The action of this cam on the lever tends to intermittently raise and lower the head-blocks of the auxiliary feed-rolls, the cam serving to hold the auxiliary feed elevated during the positive action on the feed-belts thereof. These belts are preferably arranged, as shown in Fig. 1, separated by intermediate plates 25, spanning the opening in the feed-table and serving to support the stock as against sagging. These plates are removably secured, so that they may be adjusted to accommodate stock of different sizes.

The same idea involved in the main feed of a gradually-increasing speed imparted to the feed-belts is observed in the auxiliary feed, with the result that I am enabled to handle stock of large proportions without difficulty, the additional forward impulse by the auxiliary feed tending to hold the stock well up against the main feed.

As pointed out in my before-noted patent, my sheet feed or separator is charcterized by the fact that while the two coacting contacts will revolve in unison when in direct engagement and also when but a single sheet is interposed between them, yet when there is a plurality of sheets present the complementary coacting element is retarded and only the sheet with which the positively-driven contact is in direct engagement will be separated from the others. In the present invention this positively-driven contact element is given a gradually-accelerated speed, as is also the auxiliary feed mounted in rear thereof.

In the arrangement shown the feed is effected from the bottom of a pile or stack of paper which is kept well up in place, with the forward edges of the sheets graduated or slightly advanced by the rotation of the endless bands 3, augmented by the action of bands 14.

I claim as my invention—

1. A sheet feed or separator having two coacting contacts, one being frictionally retarded but driven by the other only when they are in direct engagement or with a single sheet interposed, such other contact being driven at a constantly-increased speed, the maximum of which is coextensive with the cessation thereof.

2. A sheet feed or separator having two coacting contacts, one being frictionally retarded but driven by the other only when they are in direct engagement or with a single sheet interposed, such other contact being intermittently driven at a uniform gradually-increasing speed.

3. A sheet feed or separator having two coacting contacts, one being frictionally retarded but driven by the other only when they are in direct engagement or with a single sheet interposed, such other contact having a series of bands for coacting with the frictionally-retarded contact and means for intermittently operating said bands at a uniform gradually-increasing speed.

4. A sheet feed or separator having two coacting contacts, one being frictionally retarded but driven by the other only when they are in direct engagement or with a single sheet interposed, such other contact having a series of bands for coacting with the frictionally-retarded contact, means for intermittently operating such bands at a uniform gradually-increasing speed, and means for withdrawing the stock from said contacts, such stock being overfed to such withdrawing means by the endless bands, such bands being free to rotate under the withdrawal of the stock by the withdrawal means, as set forth.

5. The combination with a sheet feed or separator for feeding from a pile of stock, of means for intermittently actuating the same at a gradually-increasing speed, an auxiliary feed mounted in rear of such feed or separator and designed to engage such pile, and means for imparting to such auxiliary feed an intermittent gradually-increasing speed.

6. The combination with a sheet feed or separator for feeding from the bottom of a pile of stock, of means for intermittently actuating the same at a gradually-increasing speed, an auxiliary feed mounted in rear of such feed or separator and designed to engage the bottom of such pile, and means for imparting to such auxiliary feed an intermittent gradually-increasing speed, as set forth.

7. The combination with a sheet feed or separator for feeding from the bottom of a pile of stock, of means for intermittently actuating the same at a gradually-increasing speed, an auxiliary feed mounted in rear of such feed or separator, means for intermittently moving such auxiliary feed into and out of contact with the bottom of such pile, and means for imparting to such auxiliary feed, when in contact with said pile, a gradually-increasing speed, as set forth.

8. The combination with a sheet feed or separator for feeding from the bottom of a pile of stock, of means for intermittently actuating the same at a gradually-increasing speed, an auxiliary feed mounted in rear of such feed or separator having a series of endless bands, means for intermittently moving such bands into and out of contact with the bottom of such pile, and actuating means connecting said auxiliary feed to the main feed or separator for imparting to the bands thereof a gradually-increasing speed, such bands being so actuated when in contact with the bottom of said pile, as set forth.

9. The combination with the feed or separator, of the table in rear thereof having a transverse opening therein, the heads movable in such opening, rolls mounted in such heads, endless bands engaging such rolls, said bands being normally beneath the plane of the table-top, means for intermittently raising and lowering said heads, and means for actuating said bands when the heads are raised, as set forth.

10. The combination with the feed or separator, of the table in rear thereof having a transverse opening therein, the heads movable in such opening, rolls mounted in such heads, endless bands engaging such rolls, said bands being normally beneath the plane of the table-top, and arranged with intervening spaces, supporting-plates extending across the opening in the table-top in line with the spaces between the bands, means for removably securing such plates to the table, means for intermittently raising and lowering said heads, and means for actuating said bands when the heads are held raised, as set forth.

In testimony whereof I have signed this specification in the presence of two subscribing witnesses.

CHARLES GRANT HARRIS.

Witnesses:

J. R. GILBERT,

C. G. PRITCHARD.